United States Patent

Ogura et al.

[11] Patent Number: 5,629,786
[45] Date of Patent: May 13, 1997

[54] LIQUID CRYSTAL DISPLAY DEVICE

[75] Inventors: Masami Ogura, Kashihara; Masayuki Yamanaka, Yamatokoriyama; Hiroshi Takanashi, Soraku-gun, all of Japan

[73] Assignee: Sharp Kabushiki Kaisha, Osaka, Japan

[21] Appl. No.: 589,545

[22] Filed: Jan. 22, 1996

[30] Foreign Application Priority Data

Jan. 26, 1995 [JP] Japan .................. 7-010991

[51] Int. Cl.$^6$ .................. G02F 1/1337; G02F 1/1335
[52] U.S. Cl. .................. 349/123; 349/124; 349/106
[58] Field of Search .................. 359/75, 76, 68, 359/77, 78

[56] References Cited

U.S. PATENT DOCUMENTS

| | | | |
|---|---|---|---|
| 4,735,492 | 4/1988 | Sekine et al. | 359/75 |
| 5,214,523 | 5/1993 | Nito et al. | 359/76 |
| 5,438,421 | 8/1995 | Sugawara et al. | 359/75 |
| 5,446,569 | 8/1995 | Iwai et al. | 359/78 |
| 5,473,455 | 12/1995 | Koike et al. | 359/76 |
| 5,540,997 | 7/1996 | Perettle et al. | 359/75 |
| 5,552,908 | 9/1996 | Kim et al. | 359/76 |

FOREIGN PATENT DOCUMENTS

| | | | |
|---|---|---|---|
| 164213 | 12/1980 | Japan | 359/76 |
| 60-263921 | 12/1985 | Japan . | |
| 2-190823 | 7/1990 | Japan . | |
| 228630 | 9/1990 | Japan | 359/76 |
| 5072559 | 3/1993 | Japan | 359/68 |
| 5-303099 | 11/1993 | Japan . | |
| 5-307180 | 11/1993 | Japan | 359/76 |

Primary Examiner—William L. Sikes
Assistant Examiner—Tiep H. Nguyen
Attorney, Agent, or Firm—Nixon & Vanderhye P.C.

[57] ABSTRACT

A liquid crystal display device has a liquid crystal layer having super twisted nematic liquid crystal with a twist angle of 260°, the liquid crystal layer being sandwiched between a first substrate and a second substrate. A color filter is formed on the second substrate. The first substrate is orientation-processed so that pretilt angles of the liquid crystal to the first substrate are 5.5°. The second substrate is orientation-processed so that pretilt angles of the liquid crystal to the second substrate are 3.0°. Therefore, it is possible to easily reduce occurrence rate of inadequate display and, at the same time, to maintain beneficial characteristics of a liquid crystal display device with a twist angle of 250° or more, i.e., a good temperature characteristic, a small contrast change against a temperature change, and good quality display.

7 Claims, 7 Drawing Sheets

LIQUID CRYSTAL DISPLAY DEVICE

FIELD OF THE INVENTION

The present invention relates to a super twisted nematic (STN) type liquid crystal display device having liquid crystal with a twist angle of 250° or more.

BACKGROUND OF THE INVENTION

Two kinds of STN type liquid crystal display devices having liquid crystal with a twist angle of 180° or more have been commercialized so far: one with a 240° twist angle and another with a 260° twist angle. But recently better temperature characteristics have been demanded with liquid crystal display devices. To be more specific, there is demanded an improvement on a contrast change due to a temperature change and an improvement on luminence non-uniformity caused by heat emitted from a backlight in a modular liquid crystal display device. Therefore, of the two kinds of STN type liquid crystal display devices, the one with a 260° twist angle is becoming more and more preferred to the other. This trend is a result of a fact: liquid crystal with a greater twist angle allows less affection by the temperature change on d·Δn (i.e., a product of cell thickness 'd' and a birefringence index of liquid crystal 'Δn') and consequently has a smaller contrast change. In short, liquid crystal with a greater twist angle can produce better quality in display.

Meanwhile, small pretilt angles of 2° to 4° are used for the STN type liquid crystal display device with the 240° twist angle (hereafter referred to as the 240° twist system). However, in order to regulate liquid crystal molecules' orientation on an orientation film surface, i.e., in order to firmly anchor liquid crystal molecules on an orientation film surface, a greater twist angle requires greater pretilt angles. Strength to regulate the liquid crystal molecules by the orientation film surface, i.e., anchoring of the liquid crystal molecules on the orientation film surface is made weak by the small pretilt angles. Therefore, liquid crystal molecules in an STN type liquid crystal display device having liquid crystal with a greater twist angle such as 260° (hereafter referred to as the 260° twist system) but with the same small pretilt angles of 2° to 4° may not respond to an applied electric field. Such an inadequate response of the liquid crystal molecules to the applied electric field causes inadequate display (in other words, the inadequate response causes the under twist domain to occur). Hence, firmer anchoring of the liquid crystal molecules and greater d/p margin are needed ('d' represents cell thickness and 'p' represents spontaneous twist pitch).

Consequently, pretilt angles to two respective substrates of a conventional 260° twist system have been set to 4° to 7° in order to anchor liquid crystal molecules by taking 4 parameters into consideration: anchoring of the liquid crystal molecules on orientation film surfaces, liquid crystal bistability, an occurrence rate of focal conic, and an occurrence rate of the under twist domain.

Theoretically, there are 3 methods to obtain great pretilt angles: (1) a change of liquid crystal composition, (2) a change of materials of an orientation film (e.g. a change of surface polarity or composition), and (3) a change of processing conditions of an orientation film (e.g., a change of baking conditions or post-baking processing conditions). But, practically no liquid crystal material can produce both great pretilt angles and basic necessary characteristics of liquid crystal such as Tni (a transition point), Δn (a birefringence index), V (driving voltage), and α (sensitivity). Therefore, the method(s) (2) and/or (3) are/is generally used in order to obtain great pretilt angles.

As described above, in a liquid crystal display device with a great twist angle, the anchoring of the orientation of the liquid crystal molecules on the orientation film surfaces is strengthened by the great pretilt angles of 4° to 7°. However, when a bed of the orientation film is provided with a color filter and etc., an irregular bed surface may cause unsmooth orientation film surface. Consequently, the great pretilt angles result in non-uniform pretilt angles to the substrate, thereby causing inadequate orientation of the liquid crystal molecules and low display quality. To be more specific, the irregular bed surface of the orientation film causes non-uniform pretilt angles on the whole substrate surface, as well as non-uniform printing and rubbing processes of the orientation film. The non-uniform pretilt angles cause non-uniform threshold voltage and display since the STN type liquid crystal display device utilizes, for display, high sensitivity of transmissivity characteristic to an applied voltage. In other words, non-uniform pretilt angles cause inadequate orientation of the liquid crystal molecules in accordance with correlation between an applied electric field and the anchoring of the liquid crystal molecules on the orientation film surface. Therefore, the non-uniform pretilt angles increase inadequate display besides inadequate display such as rubbing scratches and degrade display quality of the liquid crystal display device.

These problems can be solved by raising viscosity of the liquid crystal molecules to lower the sensitivity (hereafter referred to as α value), thereby increasing dependence of the liquid crystal molecules on an applied electric field rather than on a state of the bed surface. However, since this method worsens the rising characteristic of the liquid crystal molecules and reduces the contrast, here comes up another problem of difficulty in maintaining both the good optical characteristic and the good display quality.

It should be noted here that the problems only occur to an STN type liquid crystal display device with a twist angle of 250° or more. On the contrary, an STN type liquid crystal display device with a twist angle of less than 250° has no such problems since such a liquid crystal display device (1) does not need firm anchoring of the orientation of the liquid crystal molecules on the orientation film surfaces and (2) is arranged to have pretilt angles of 2° to 4° with the four parameters taken into consideration: anchoring of the liquid crystal molecules on the orientation film surfaces, liquid crystal bistability, an occurrence rate of focal conic, and an occurrence rate of the under twist domain. But, the STN type liquid crystal display device with the twist angle of less than 250° is not discussed in the present application since it does not produce as good display quality as the STN type liquid crystal display device with the twist angle of 250° or more.

SUMMARY OF THE INVENTION

In view of the problems, an object of the present invention is, in an STN type liquid crystal display device with a twist angle of 250° or more, to suppress degradation in display quality due to non-uniform pretilt angles caused by irregular orientation film surface and to reduce an occurrence rate of inadequate display.

In order to accomplish the object, a liquid crystal display device of the present invention has:

a first substrate with a smooth orientation film surface;

a second substrate with an orientation film surface less smooth than the first substrate; and a liquid crystal layer sandwiched between the first substrate and the second substrate, the liquid crystal layer having super twisted nematic liquid crystal whose twist angle is not less than 250°, wherein pretilt angles of the liquid crystal to the first substrate are not less than 4°, great enough to obtain required anchoring energy, and pretilt angles of the liquid crystal to the second substrate are smaller than the pretilt angles of the liquid crystal to the first substrate.

An orientation process is carried out with the first substrate of the liquid crystal display device so as to obtain the pretilt angles to the first substrate of 4° or more. In this way, the anchoring of the orientation of the liquid crystal which is necessary to a super twisted nematic type liquid crystal display device with a twist angle of 250° or more is obtained.

Meanwhile, an orientation process is carried out with the second substrate so as to obtain the pretilt angles to the second substrate which are smaller than the pretilt angles to the first substrate. In this way, the anchoring of the liquid crystal on the second substrate side becomes weaker than that on the first substrate side. As a result, the orientation of the liquid crystal molecules is less affected by the non-uniform pretilt angles even in a state where the pretilt angles become non-uniform since the orientation film surface of the second substrate fails to maintain the smoothness. And also, the orientation of the liquid crystal molecules is less affected (1) by the irregularity on the orientation film surface due to the fact that a color filter and etc. are disposed on the second substrate or (2) by non-uniform printing or rubbing processes of the orientation surface. Consequently, the degradation of the display quality and the occurrence rate of the inadequate display which are caused by the inadequate orientation of the liquid crystal molecules can be reduced.

Thus, it is possible to easily reduce the occurrence of the inadequate display and at the same time to maintain beneficial characteristics of liquid crystal display device with a twist angle of 250° or more, i.e., a good temperature characteristic, a small contrast change against a temperature change, and good quality display.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. The present invention will become more fully understood from the detailed description given hereinbelow and the accompanying drawings which are given by way of illustration only, are not in any way intended to limit the scope of the claims of the present invention.

BRIEF DESCRIPTION OF THE DRAWINGS

FIGS. 2(a) through 2(e) are illustrations showing manufacturing processes of the liquid crystal display device in FIG. 1, FIG. 2(a) showing a state where transparent electrodes are formed on a first substrate and then a polyimide orientation film is offset-printed thereon, FIG. 2(b) showing a state where this polyimide orientation film is baked at 250 degrees centigrade and rubbing-processed to form an orientation film, FIG. 2(c) showing a state where a color filter, a protection film, and transparent electrodes are formed on a second substrate and then a polyimide orientation film is offset-printed thereon, FIG. 2(d) showing a state where this polyimide orientation film is baked at 250 degrees centigrade and rubbing-processed to form an orientation film, FIG. 2(e) showing a state where the first and the second substrates are combined together and liquid crystal is injected in between.

DESCRIPTION OF THE EMBODIMENTS

[First embodiment]

Referring to FIG. 1 to FIG. 5, the following description will discuss the first embodiment of the present invention.

Figure 1:
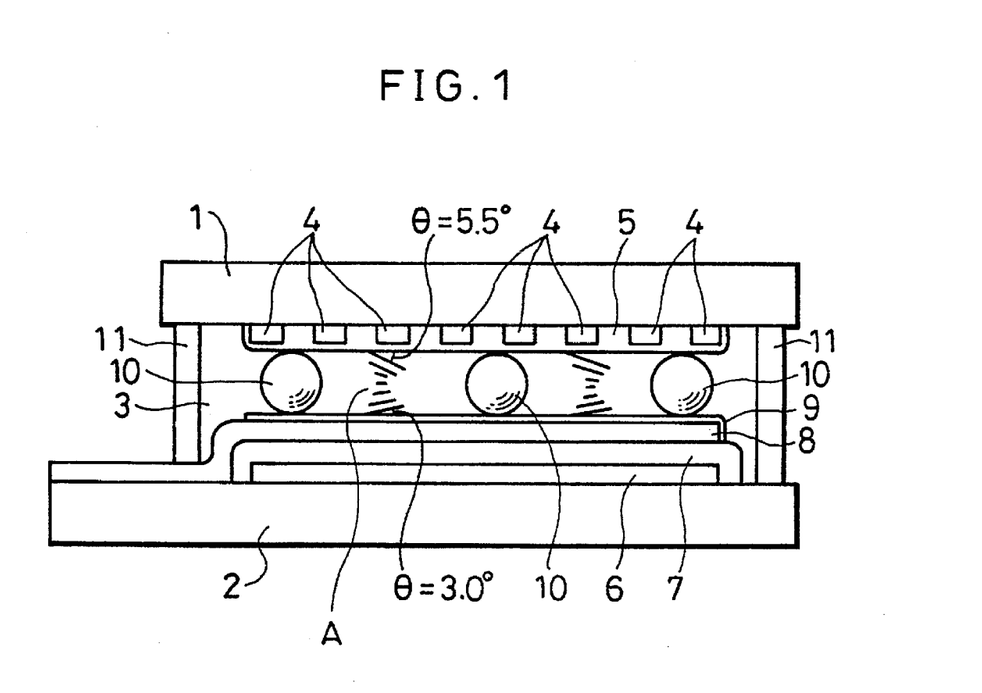
FIG. 1 is a schematic illustration of a liquid crystal display device in accordance with one embodiment of the present invention.

A liquid crystal display device in accordance with the present embodiment has, as shown in FIG. 1, the structure of a liquid crystal layer 3 sandwiched between a pair of first and second transparent substrates 1 and 2. The substrates 1 and 2 are made of, for example, glass. Transparent electrodes 4 and transparent electrodes 8 are provided in a stripe manner on the inner side of the substrate 1 and the substrate 2 respectively. The transparent electrodes 4 are provided so as to be orthogonal to the transparent electrodes 8. The liquid crystal layer 3 is composed of super twisted nematic (STN) liquid crystal having a twist angle of 260° and an $\alpha$ value showing liquid crystal's sensitivity of 1.035.

An orientation film 5 is provided on the transparent electrodes 4 of the first substrate 1. An orientation film 9 is provided on the transparent electrodes 8 of the second substrate 2. A color filter 6 and a protection film 7 are, in this order from the substrate 2, sandwiched between the second substrate 2 and the transparent electrodes 8. Orientation of liquid crystal molecules A of the liquid crystal layer 3 is determined by the orientation films 5 and 9.

When the orientation films 5 and 9 are provided on the first substrate 1 and the second substrate 2 respectively, the orientation process is carried out with respect to the first substrate 1 and the second substrate 2 so that pretilt angles $\theta$ of the liquid crystal molecules to the second substrate 2 are smaller than pretilt angles $\theta$ to the first substrate 1. By the orientation processing to the first substrate 1 and the second substrate 2, the pretilt angles $\theta$ of the liquid crystal molecules A to the first substrate 1 are set to 5.5°; the pretilt angles $\theta$ of the liquid crystal molecules A to the second substrate 2 are set to 3.0°.

The two substrates 1 and 2 have spacers 10 in between to maintain a distance between the two substrates 1 and 2 (hereafter referred to as cell gap) and are combined with each other by sealant 11.

In the liquid crystal display device in accordance with the arrangement, a polarizing plate (not shown) is provided on the outer side of each substrate and optical compensating members such as a phase difference plate are provided between the first substrate 1 and the polarizing plate.

Referring to FIGS. 2(a) to 2(e), the following description will discuss manufacturing processes of the liquid crystal display device in accordance with the arrangement.

Figure 2A:
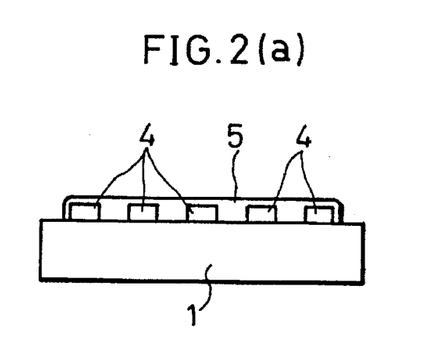
Figure 2B:
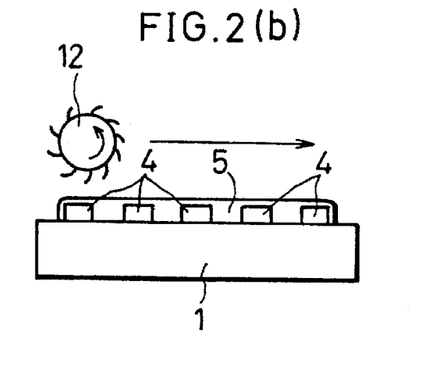
Figure 2C:
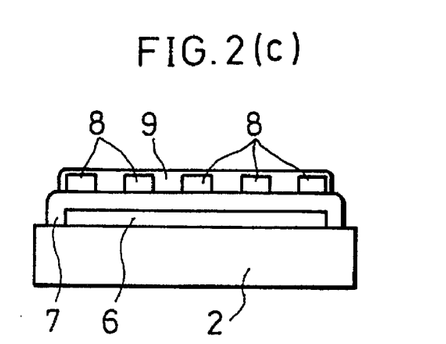
Figure 2D:
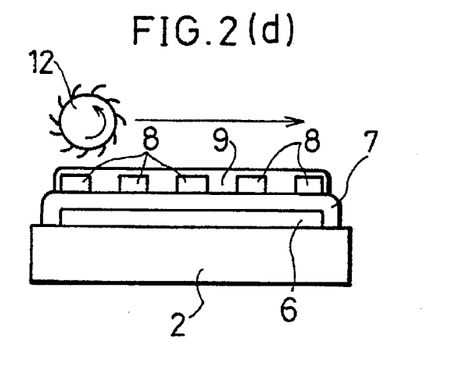
Figure 2E:
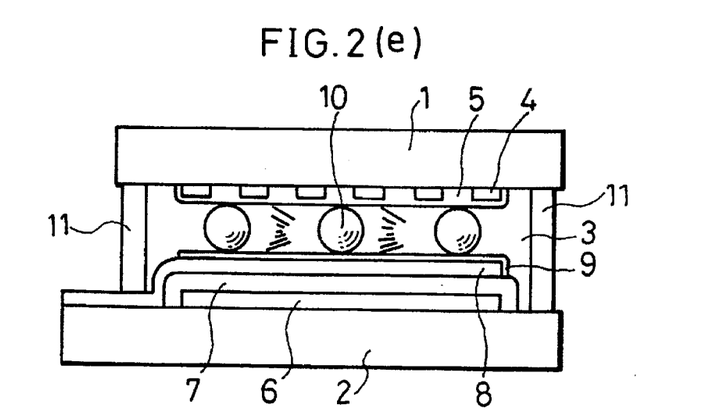

First, the transparent substrate 1 made of glass is undercoated with silica (SiO). Then, as shown in FIG. 2(a), an ITO (Indium Tin Oxide) film is formed by the sputtering method and then etched in a predetermined pattern to form the transparent electrodes 4.

Next, a polyimide orientation film (e.g., PSiA-4104 manufactured by Chisso Corporation) for obtaining great pretilt angles with the liquid crystal molecules A of the liquid crystal layer 3 is offset-printed on the transparent electrodes 4 and baked at 250 degrees centigrade. Then, in order to form the orientation film 5, a rubbing process for obtaining a 260° twist angle is carried out as in FIG. 2(b) by a cotton roller 12 on which cotton cloth is provided.

Meanwhile, the transparent substrate 2 made of glass is undercoated with silica (SiO). Then, the color filter 6 is formed by a method such as a pigment dispersing method and a coloring method which are based on the photolithography technology (see FIG. 2(c)). The protection film 7 made of thermosetting resin such as epoxy resin is formed over the color filter 6 to protect and smooth the surface of the color filter 6.

On the second substrate 2 provided with the color filter 6 and the protection film 7, the transparent electrodes 8 are formed by using the same process applied to the first substrate 1. Then, a polyimide orientation film to obtain small pretilt angles with the liquid crystal molecules A of the liquid crystal layer 3 (e.g., SE150 manufactured by Nissan Chemical Industries, Ltd.) is offset-printed and baked at 250 degrees centigrade. The polyimide orientation film here for the second substrate 2 is different from the above polyimide orientation film for the first substrate 1. Then, in order to provide the orientation film 9, the rubbing process for obtaining a 260° twist angle is carried out as in FIG. 2(d) by the cotton roller 12 on which cotton cloth is provided.

Next, the epoxy resin sealant 11 is screen-printed in the periphery of the second substrate 2, and the spacers 10 with a particle diameter of 6 μm are dispersed on the second substrate 2 in order to obtain a predetermined cell gap. Thereafter, the first substrate 1 and the second substrate 2 are combined together (see FIG. 2(e)), and the liquid crystal is injected in between to complete the manufacturing processes of the liquid crystal display device.

According to a measurement, the pretilt angles θ of the liquid crystal display device manufactured as above are 5.5° to the first substrate 1 and 3.0° to the second substrate 2.

Generally, in an STN type liquid crystal display device having liquid crystal with a twist angle of 250° or more, pretilt angles are set to 4° to 7° because orientation of the liquid crystal molecules should be anchored firmly. In contrast, in an STN type liquid crystal display device having liquid crystal with a twist angle smaller than 250°, pretilt angles are set to 2° to 4° because orientation of the liquid crystal molecules does not have to be anchored so firmly.

Note that it is sufficient to adapt the pretilt angles to at least one of the two substrates in accordance with the twist angle in order to anchor the orientation of the liquid crystal. Therefore, the 5.5° pretilt angles of the liquid crystal to the first substrate 1 of the present embodiment is great enough to firmly anchor the orientation of the liquid crystal of the liquid crystal layer 3.

A conventional STN type liquid crystal display device utilizes for display high sensitivity of transmissivity characteristic to an applied voltage. Therefore, non-uniform pretilt angles are likely to cause non-uniform threshold voltage and display. It is necessary to maintain smooth an orientation film surface in order to obtain uniform pretilt angles. However, when a color filter is provided on the bed of an orientation film, a protection film covering the orientation film for protecting and smoothing the orientation film surface is not enough to obtain a smooth orientation film surface. For this reason, the non-uniformity of the pretilt angles grows greater when the pretilt angles become greater and, therefore, is likely to affect liquid crystal molecules.

In contrast, according to the liquid crystal display device of the present embodiment, the pretilt angles of the liquid crystal on the second substrate 2 side where the color filter 6 is provided are set to 3.0°. Such pretilt angles can prevent the orientation film 9 from firmly anchoring the orientation of the liquid crystal molecules A. In other words, since the orientation of the liquid crystal on the second substrate 2 side is less anchored than that on the first substrate 1 side, it is possible, even in the case of the non-uniform pretilt angles of the liquid crystal to the second substrate 2, to reduce the occurrence that the orientation of the liquid crystal molecules A is affected. In this way, even for the case where the surface irregularity of the orientation film 9 falls in the range of ±0.1 μm to 0.5 μm (lack of smoothness) due to the fact that the color filter 6 is provided on the second substrate 2, for the case where a non-uniform printing is carried out with respect to the orientation film 9 or for the case where a non-uniform rubbing processing is carried out with respect to orientation film 9, it is possible to reduce the occurrence of the inadequate orientation of the liquid crystal molecules A and to restrain the occurrence of the inadequate display of the liquid crystal display device.

The following description will compare (1) a temperature characteristic and (2) correlation of an occurrence rate of inadequate display and pretilt angles of (a) the liquid crystal display device of the foregoing arrangement (the first embodiment), (b) a conventional STN type liquid crystal display device with a twist angle of 240° (the first comparative example), and (c) a conventional STN type liquid crystal display device with a twist angle of 260° (the second comparative example). Note that pretilt angles on both substrates of the first comparative example are set to a same value between 2° and 4° and that pretilt angles on both substrates of the second comparative example are set to a same value between 4° and 7°.

Figure 3:
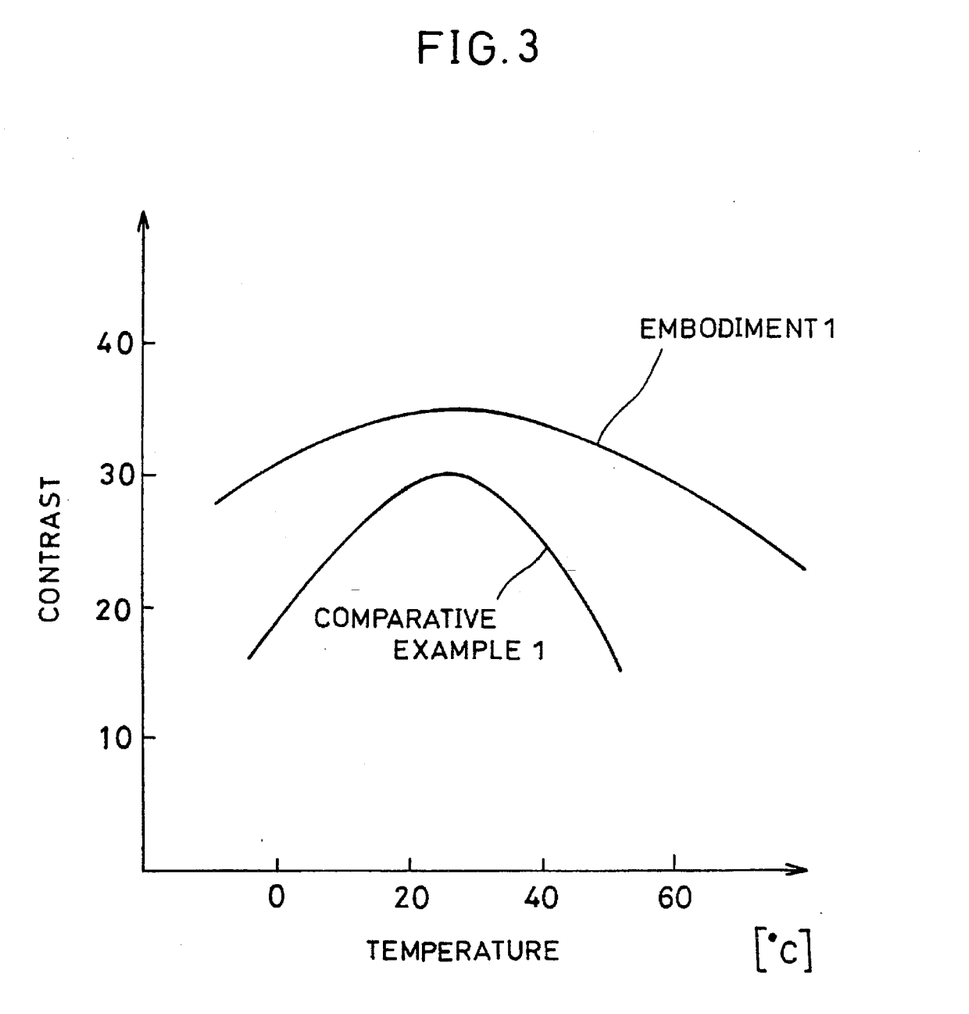
FIG. 3 is a graph showing correlation between temperature and contrast of the liquid crystal display device of FIG. 1 and of a conventional one.

FIG. 3 shows a comparison of the temperature characteristic between the liquid crystal display devices of the first embodiment and of the first comparative example. It is understood that the liquid crystal display device of the first embodiment has a wider temperature range where the contrast is kept than the liquid crystal display device of the first comparative example. That is, the liquid crystal display device of the first embodiment has a superior temperature characteristic to the liquid crystal display device of the first comparative example. The contrast ratio obtained here with the first embodiment is 1:35.

Figure 4:
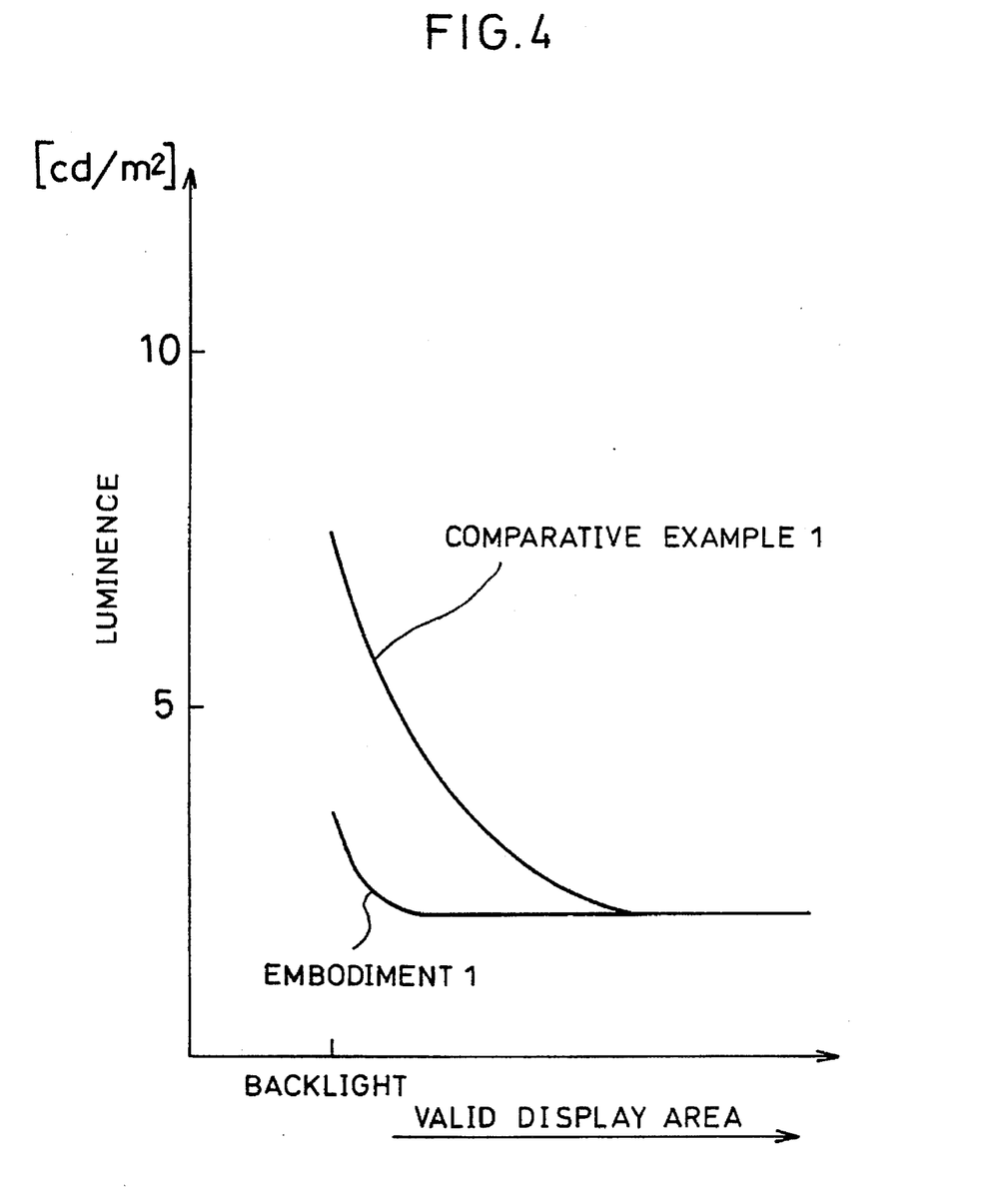
FIG. 4 is a graph showing luminence non-uniformity near a backlight of the liquid crystal display device of FIG. 1 and of a conventional one.

The liquid crystal display device of the first embodiment is less affected by heat emitted from a backlight. As a result, in the modular liquid crystal display in which a backlight is provided, non-uniform luminence caused by the heat emitted from the backlight has been greatly reduced as shown in FIG. 4. If valid display area in the modular liquid crystal display is far from the backlight (the right-hand side in FIG. 4), affection by the heat emitted from the backlight is small and therefore, no significant difference in luminence exists between the first embodiment and the first comparative example. Meanwhile, the difference is significant in the area close to the backlight where the affection by the heat emitted from the backlight is big. Here, the luminence of the liquid crystal display device of the first comparative example increases and the luminence non-uniformity in the valid display area is likely to occur; the luminence of the liquid crystal display device of the first embodiment does not increase as much as the liquid crystal display device of the first comparative example and, thus, the occurrence of the luminence non-uniformity in the valid display area is suppressed.

Figure 5:
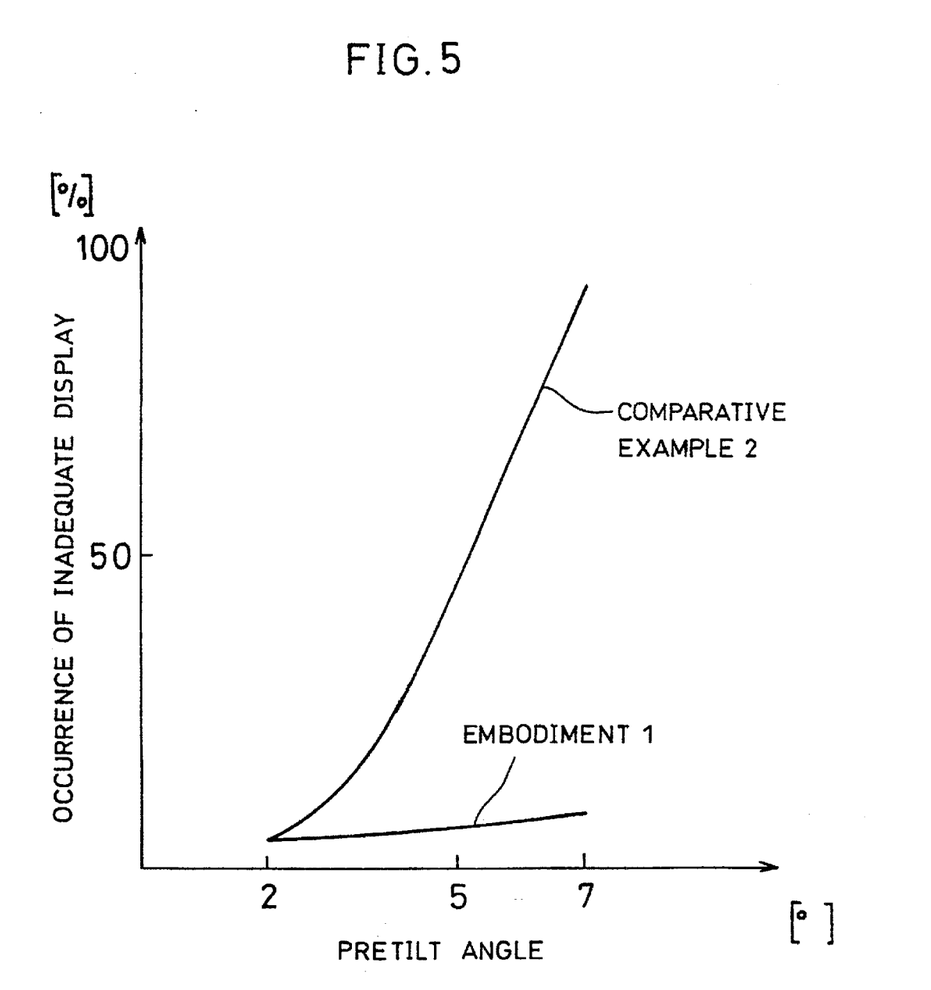
FIG. 5 is a graph showing correlation between pretilt angles and an occurrence rate of inadequate display of the liquid crystal display device of FIG. 1 and of a conventional one.

FIG. 5 shows a comparison of inadequate display occurrence rates between the two STN type liquid crystal display devices of the same twist angle (the first embodiment and the second comparative example) under 70% of the optimal voltage where defects of a liquid crystal display device can be detected most easily. It is understood that as the pretilt angles becomes greater, the inadequate display occurrence rate drastically increases in the liquid crystal display device of the second comparative example, but the rate does not so increase in the liquid crystal display device of the first embodiment.

With the comparisons taken into consideration, the liquid crystal layer 3 of the liquid crystal display device of the present embodiment is made of STN liquid crystal with the twist angle of 260°. And also, the two substrates 1 and 2 are orientation-processed so that the pretilt angles to the first substrate 1 are set to not less than 4°; the pretilt angles to the second substrate 2 are set to less than the pretilt angles to the first substrate 1. Hence, the orientation film 5 on the first substrate 1 side maintains the anchoring of the orientation of the liquid crystal and the orientation of the liquid crystal molecules A is not affected by an irregular orientation film 9 surface.

Thus, it is possible to reduce the occurrence rate of the inadequate display and at the same time to maintain beneficial characteristics of the liquid crystal display device with a twist angle of 250° or more, i.e., a good temperature characteristic, a small contrast change against a temperature change, and good quality display.

[Second Embodiment]

Figure 6:
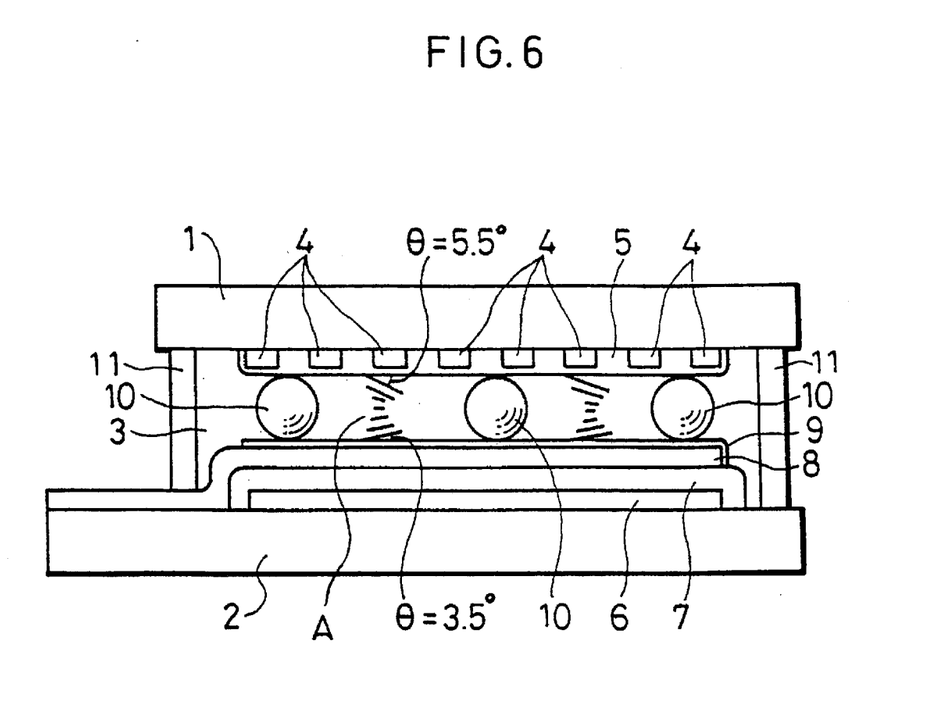
FIG. 6 is a schematic illustration showing a liquid crystal display device in accordance with another embodiment of the present invention.
Figure 7:
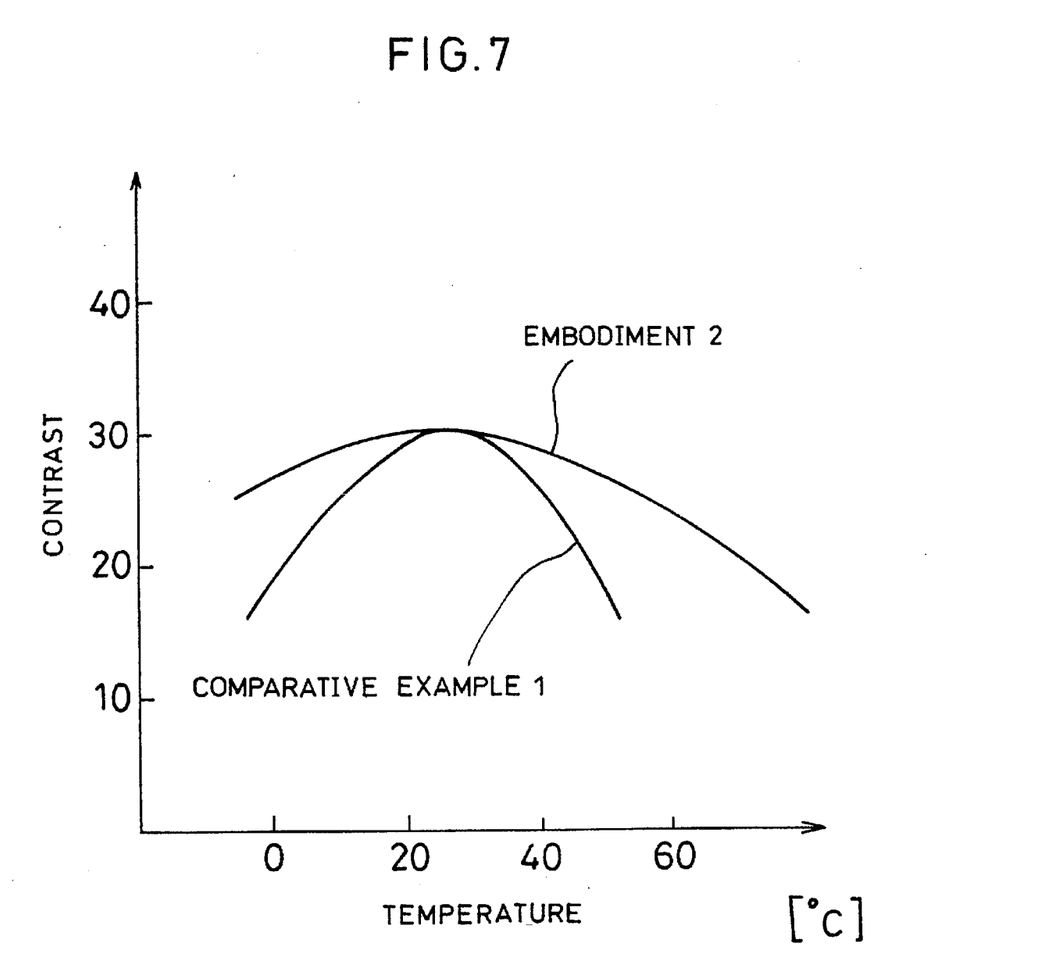
FIG. 7 is a graph showing correlation between temperature and contrast of the liquid crystal display device of FIG. 6 and of a conventional one.

Referring to FIGS. 6 and 7, the following description will discuss the second embodiment of the present invention. Here, for convenience, members of the second embodiment that have the same arrangement and function as members of the first embodiment, and that are mentioned in the first embodiment are indicated by the same reference numerals and description thereof is omitted.

The liquid crystal display device of the second embodiment shown in FIG. 6 is manufactured through the same processes as the liquid crystal display device of the first embodiment shown in FIG. 1 except two processes: (1) the orientation film 9 is baked at a temperature of 220 degrees centigrade instead of 250 degrees centigrade and (2) the same material (a polyimide orientation film for obtaining a great tilt angle) is used to form both the orientation film 5 and the orientation film 9.

A measurement of the pretilt angles of the liquid crystal display device manufactured as above at the baking temperature of 220 degrees centigrade instead of 250 degrees centigrade has revealed that the pretilt angles θ to the first substrate 1 remain at 5.5°, the same angles as the pretilt angles of the liquid crystal display device shown in FIG. 1. But, the lower baking temperature caused the pretilt angles to the second substrate 2 to be 3.5°, which is greater than 3.0° in the first embodiment.

FIG. 7 shows a comparison of contrast between the liquid crystal display device arranged as above (the second embodiment) and the liquid crystal display device of the first comparative example with same pretilt angles set to 2° to 4° on both substrates. It is understood that the liquid crystal display device of the second embodiment has a wider temperature range where the contrast is kept than the liquid crystal display device of the first comparative example. That is, the liquid crystal display device of the second embodiment has a superior temperature characteristic to the liquid crystal display device of the first comparative example. The contrast ratio obtained here with the second embodiment is 1:30.

Moreover, the second embodiment, just like the first embodiment, has a less inadequate display occurrence rate of the liquid crystal display device than the conventional STN type liquid crystal display device with 260° twist angle Therefore, it is also possible in the embodiment to reduce the occurrence rate of the inadequate display and at the same time to maintain beneficial characteristics of the liquid crystal display device with a twist angle of 250° or more, i.e., a good temperature characteristic, a small contrast change against a temperature change, and good quality display.

In the present embodiment, the orientation film 9 is made of the same polyimide orientation film for obtaining the great tilt angle as the orientation film 5. It should be noted, however, that it is also possible to form the orientation film 9 out of a polyimide orientation film for a small tilt angle just like the first embodiment, or even another orientation film material.

Also, in the embodiments, in order to obtain the smaller pretilt angles to the second substrate than the pretilt angles to the first substrate, either the orientation film material or the baking temperature of the orientation film material is changed. However, both the material and the temperature or other conditions of the orientation process may be also changed so as to obtain the different pretilt angles to the respective two substrates 1 and 2.

As discussed above, the liquid crystal display device of the present invention has the different pretilt angles to the respective two substrates. Other liquid crystal display devices having different pretilt angles on the two substrates are disclosed in Japanese Laid-Open Patent Applications No. 263921/1985 (Tokukaishou 60-263921), No. 303099/1993 (Tokukaihei 5-303099), and No. 190823/1990 (Tokukaihei 2-190823).

Japanese Laid-Open Patent Application No. 263921/1985 (Tokukaishou 60-263921) discloses that in order to achieve both a high duty and control of non-uniform display (domain) of a TN type liquid crystal display device, orientation films with different polarizations are used: an orientation film with weak polarity is formed on one of the two substrates so as to obtain small pretilt angles and an orientation film with strong polarity is formed on another so as to obtain great pretilt angles. With the arrangement, the high duty is achieved on the orientation film with weak polarity and the control of non-uniform display is achieved on the orientation film with strong polarity.

However, Japanese Laid-Open Patent Application No. 263921/1985 (Tokukaishou 60-263921) relates to the TN type liquid crystal display device and is different from the present invention. Namely, the present invention deals with the STN type liquid crystal display device with the twist angle of 250° or more which utilizes the small pretilt angles in order to control the degradation of the display quality due to the non-uniform pretilt angles caused by the irregular orientation film surface.

Japanese Laid-Open Patent Application No. 303099/1993 (Tokukaihei 5-303099) discloses that in order to eradicate non-uniform luminence by making a vertical visual characteristic symmetrical, two substrates are orientation-processed to have different pretilt angles and combined together so that the directions of orientation processes of the two substrates become parallel. With the arrangement, liquid crystal at the center of the liquid crystal layer is tilted towards a certain direction and the non-uniform luminence is thus eradicated.

However, Japanese Laid-Open Patent Application No. 303099/1993 (Tokukaihei 5-303099) relates to improving the vertical visual characteristics of the liquid crystal display device having the two substrates combined together so that the directions of the orientation processes of the two substrates become parallel and is different from the present invention. Namely, the present invention deals with the degradation of the display quality due to the non-uniform pretilt angles caused by the irregular orientation film surface in an STN type liquid crystal display device. Japanese Laid-Open Patent Application No. 190823/1990 (Tokukaihei 2-190823) discloses that orientation of a substrate with a color filter has approximately homogeneous orientation and another substrate has tilt orientation. With the arrangement, a baking process at a temperature of not less than 200 degrees centigrade is not necessary because the substrate with the color filter has approximately the homogeneous orientation. Therefore, the substrate with the color filter can be orientation-processed easily.

Japanese Laid-Open Patent Application No. 190823/1990 (Tokukaihei 2-190823) relates to the STN type liquid crystal display device. But, since a system with a twist angle of 250° or more like the present invention needs firm anchoring of liquid crystal, the homogeneous orientation of the substrate with the color filter can not anchor liquid crystal firmly enough for such a system. A problem of non-uniform display occurs consequently.

As explained above, in techniques disclosed in the laid-open patent applications, two opposing substrates are orientation-processed to have different pretilt angles from each other. But, the techniques can not produce the STN type liquid crystal display device with a twist angle of 250° or more which maintains the excellent temperature characteristic of the great twist angle and reduces the occurrence rate of the inadequate display like the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display device, comprising:

a first substrate with a smooth orientation film surface;

a second substrate with an orientation film surface less smooth than the first substrate; and a liquid crystal layer sandwiched between the first substrate and the second substrate, the liquid crystal layer having super twisted nematic liquid crystal whose twist angle is not less than 250°, wherein pretilt angles of the liquid crystal molecules close to the first substrate is not less than 4°, and great enough to obtain required anchoring energy, and pretilt angles of the liquid crystal molecules close to the second substrate are smaller than the pretilt angles of the liquid crystal molecules close to the first substrate.

2. The liquid crystal display device as defined in claim 1, wherein a color filter is provided on the second substrate.

3. The liquid crystal display device as defined in claim 2, further comprising a protection filter for protecting and smoothing the color filter surface.

4. The liquid crystal display device as defined in claim 1, wherein the pretilt angles of the liquid crystal molecules close to the second substrate are within a range of between 2° and 4°.

5. The liquid crystal display device as defined in claim 1, wherein the orientation film on the second substrate is made of a different material from the orientation film on the first substrate so that the pretilt angles of the liquid crystal molecules close to the second substrate are smaller than the pretilt angles of the liquid crystal molecules close to the first substrate.

6. The liquid crystal display device as defined in claim 5, wherein the material of the orientation film formed on the first substrate is a polyimide orientation film producing liquid crystal with great pretilt angles, and the material of the orientation film formed on the second substrate is a polyimide orientation film producing liquid crystal with small pretilt angles.

7. A manufacturing process of a liquid crystal display device, the liquid crystal display device comprising:

a first substrate with a smooth orientation film surface;

a second substrate with an orientation film surface less smooth than the first substrate; and a liquid crystal layer sandwiched between the first substrate and the second substrate, the liquid crystal layer having super twisted nematic liquid crystal whose twist angle is not less than 250°, wherein pretilt angles of the liquid crystal molecules close to the first substrate are not less than 4°, and great enough to obtain required anchoring energy, and pretilt angles of the liquid crystal molecules close to the second substrate are smaller than the pretilt angles of the liquid crystal molecules close to the first substrate, the manufacturing process of the liquid crystal display device, comprising a step for baking a material of the orientation film on the second substrate at a lower temperature than a material of the orientation film on the first substrate so that the pretilt angles of the liquid crystal molecules close to the second substrate are smaller than the pretilt angles of the liquid crystal molecules close to the first substrate.

\* \* \* \* \*